US007617316B2

(12) United States Patent
Kim et al.

(10) Patent No.: US 7,617,316 B2
(45) Date of Patent: Nov. 10, 2009

(54) NETWORK CONNECTION DEVICE, NETWORK SYSTEM AND METHOD FOR AVOIDING DUPLICATION OF PROXY FUNCTION

(75) Inventors: Do-heon Kim, Seoul (KR); Hyun-gyoo Yook, Seoul (KR); Hyun-sik Yoon, Seoul (KR); Tae-jin Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 10/980,436

(22) Filed: Nov. 4, 2004

(65) Prior Publication Data

US 2005/0102369 A1 May 12, 2005

(30) Foreign Application Priority Data

Nov. 10, 2003 (KR) .................... 10-2003-0079090

(51) Int. Cl.
*G06F 15/16* (2006.01)
(52) U.S. Cl. ........................ 709/226; 709/220
(58) Field of Classification Search ............. 709/223, 709/224, 226, 220
See application file for complete search history.

(56) References Cited

U.S. PATENT DOCUMENTS 7,325,057 B2 * 1/2008 Cho et al. .............. 709/224

| 2002/0029256 | A1 | 3/2002 | Zintel et al. |
| 2002/0083143 | A1 | 6/2002 | Cheng |
| 2003/0009537 | A1 | 1/2003 | Wang |

FOREIGN PATENT DOCUMENTS

| EP | 1286501 A1 | 2/2003 |
| JP | 2002-222160 A | 8/2002 |
| JP | 2003-008610 A | 1/2003 |
| KR | 2001-0092525 A | 10/2001 |
| KR | 2003-0038924 A | 5/2003 |
| WO | WO 02/073921 A2 | 9/2002 |
| WO | 03045015 A2 | 5/2003 |
| WO | WO 03/045015 A2 * | 5/2003 |

* cited by examiner

*Primary Examiner*—David Lazaro
(74) *Attorney, Agent, or Firm*—Sughrue Mion, PLLC

(57) ABSTRACT

A network connection device, network system and method for avoiding duplication of proxy functions. The network connection device includes a bridge module for relaying a communication module of a first communication mode and a communication module of a second communication mode, a proxy Universal Plug and Play (UPnP) service module, connected with the bridge module, for providing a proxy function of a network device of the second communication mode, and a duplicate proxy Universal Plug and Play service module, connected with the communication module of the first communication mode and the proxy Universal Plug and Play service module, for preventing the proxy function of the network device of the second communication mode from being duplicated and activated at a plurality of bridges.

24 Claims, 13 Drawing Sheets

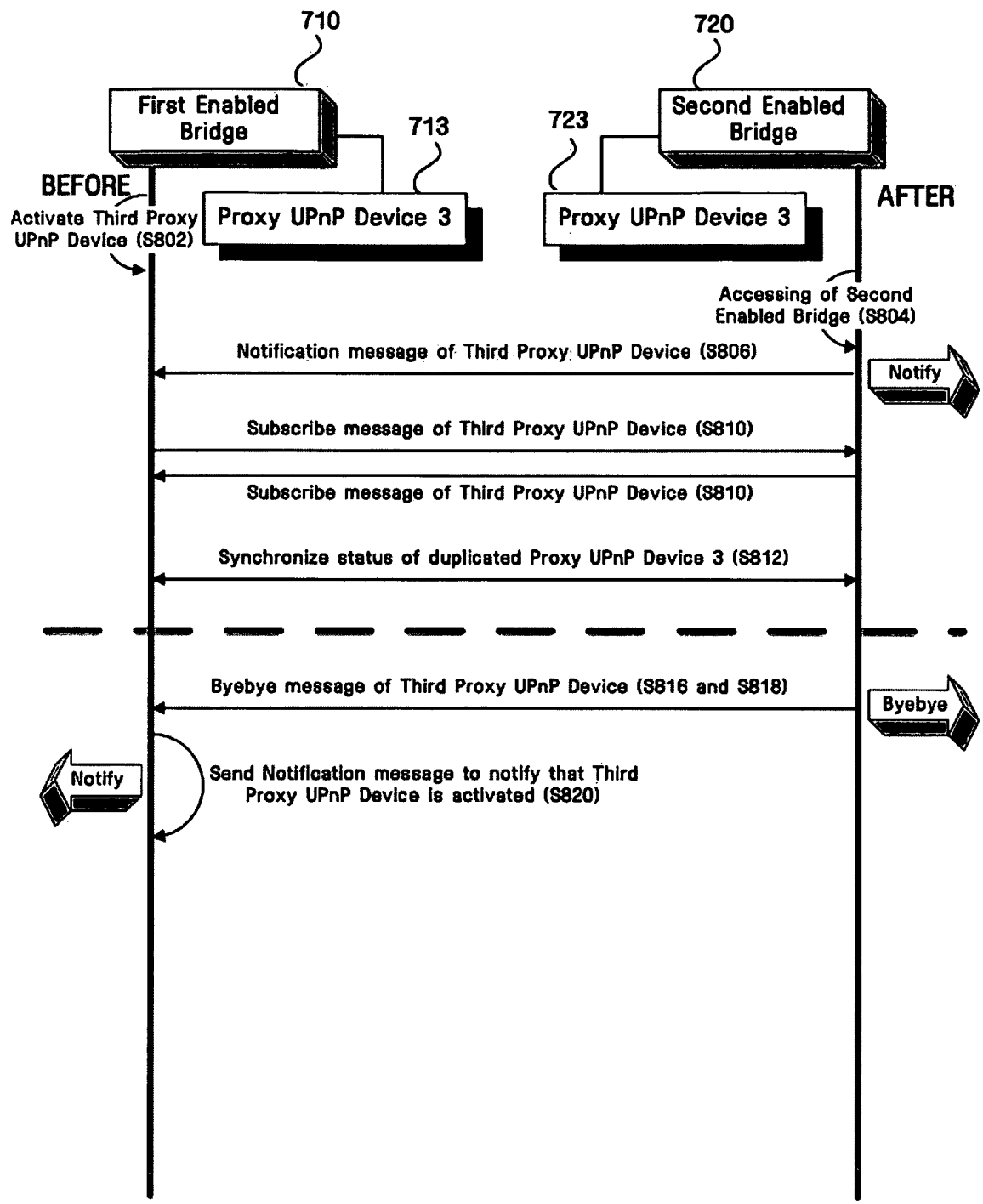

NETWORK CONNECTION DEVICE, NETWORK SYSTEM AND METHOD FOR AVOIDING DUPLICATION OF PROXY FUNCTION

BACKGROUND OF THE INVENTION

This application claims the priority of Korean Patent Application No. 10-2003-0079090 filed on Nov. 10, 2003, in the Korean Intellectual Property Office, the disclosure of which is incorporated herein in its entirety by reference.

1. Field of the Invention

The present invention relates to a network connection device, network system and method for avoiding duplication of proxy functions and, more particularly, to a network connection device, network system and method for avoiding duplication of proxy functions through synchronization of status of proxy Universal Plug and Play (UPnP) devices and preventing the proxy functions from being duplicated and activated, by introducing at least one enabled bridge realizing a function of preventing a collision generated when two or more bridges realizing the proxy function of a network device of a second communication mode (e.g., non-TCP/IP layer communication mode) are present within the same home network.

2. Description of the Related Art

A home network is normally constituted of an Internet protocol (IP) based private network, and governs various instruments such as personal computers (PCs) of all form factors, intelligent appliances and wireless devices which are used in a household in connection with each other through a common virtual computing environment called "middleware" over a single network.

The "middleware" connects various digital devices in a peer-to-peer mode to allow communication between them, and is exemplified by Home Audio Video Interoperability (HAVI), Universal Plug and Play (UPnP), Java Intelligent Network Infra-structure (JINI), Home Wide Web (HWW) and so forth, which have been proposed.

In the computing environment established through the middleware of UPnP, according to a Dynamic Host Configuration Protocol (DHCP), each device has an IP address assigned from a DHCP server or selected by automatic IP addressing (Auto IP), thereby performing communication between them as well as search/inquiry on a network.

A UPnP network is composed of at least one home network device (hereinafter, referred to as a "controlled device") as a device connected to an IP based home network and controlled, and a control point as a device for controlling the controlled device.

FIGS. 1A to 1D are operational flow charts showing operation of each step in a control process between devices in a conventional UPnP network.

In the UPnP network, the control process between devices is divided into a discovery-advertisement process, a description process, a control process and an eventing process.

FIG. 1A shows the discovery-advertisement process, which is generally divided into advertisement and discovery processes. The advertisement process allows a new controlled device to be advertised to other devices when the new controlled device is added to the home network, and the discovery process allows a new control point to search for the controlled devices in operation on the network when the new control point is added to the home network.

First, in the advertisement process, the new controlled device added to the network has an IP address assigned through the DHCP as a search protocol or the Auto IP according to an addressing process. After the IP address assignment, the new controlled device multicasts a plurality of advertising messages advertising itself to other controlled devices and control points on the network, thereby advertising its services provided through its embedded devices.

Further, any control point capable of controlling operation of the controlled device receives its multicast advertising message to register itself in the controlled device.

By contrast, in the discovery process, the new control point added to the network has an IP address assigned through the DHCP as a search protocol or the Auto IP according to an addressing process. After the IP address assignment, the new control point multicasts a search message in order to identify controlled devices in operation on the network according to a simple service discovery protocol (SSDP).

Further, the controlled devices receiving the search message sent from the control point unicast a response message to the new control point in response to the received search message.

FIG. 1B shows the description process, in which the control point checks either a service description XML (extensible markup language) file or a device description XML file through the IP address of the controlled device obtained in the discovery-advertisement process in order to control the controlled device, thereby learning in more detail about functions of a newly added device.

In other words, the control point intending to control the controlled device requests the controlled device to send the service description XML file or the device description XML file, and parses the description XML file (UPnP description for device or service) which is sent from the controlled device.

FIG. 1C shows the control process, in which, in the case where the control point intends to provide particular services through the controlled device, the control point transmits an action request for requesting a predetermined service to the controlled device of interest using a Simple Object Access Protocol (SOAP) according to a UPnP device architecture, and receives a response message such as any result and any variable value.

These action and response messages are sent/received using the IP address of the controlled device obtained in the addressing and discovery-advertisement processes, and are expressed in XML using the SOAP.

FIG. 1D shows the eventing process, in which the information change of the controlled device providing predetermined services by an action command sent from the control point is checked.

To be more specific, in the case where a subscription request is sent in order to check the information change of the controlled device at the control point, the controlled device sends an event message formatted in the XML form through Generic Event Notification Architecture (GENA) in order to inform changed information. The control point receives the event message sent from the controlled device and processes the received event message into description updates of the controlled device.

FIG. 2 shows a state where one bridge within a conventional home network realizes proxy UPnP devices to non-TCP/IP layer based network devices.

First, second and third network devices 10, 20 and 30 are each connected to a non-TCP/IP based network line 80 such as a power line enabling power line communication, to each of which a device card 60 providing its information is mounted. The network line 80 is connected to a bridge 40.

In order to exert a UPnP function on the home network, the network devices 10, 20 and 30 must be operated on the basis of a TCP/IP layer. A control point 50, a TCP/IP layer based network device, is intended to control the network devices 10, 20 and 30 through another TCP/IP based network line 70 such as a Local Area Network (LAN), but the control point 50 can not directly control the network devices because the network devices 10, 20 and 30 are not based on the TCP/IP layer. For this reason, the bridge 40 is introduced, within which first, second and third proxy UPnP devices 11, 21 and 31, which realize proxy functions of the network devices 10, 20 and 30 respectively, are set. Thereby, it is possible for the control point 50 under the UPnP environment to control the network devices. As shown in FIG. 2, each of the network devices 10, 20 and 30 is connected to one bridge 40. The bridge 40 is operated without a special collision problem because the proxy functions of the network devices are realized.

FIG. 3 shows a state where two bridges within a conventional home network simultaneously realize proxy UPnP devices with respect to network devices.

A first bridge 40 realizes the proxy functions of the first network device 10 and the third network device 30, and a second bridge 42 realizes the proxy functions of the second and third network devices 20 and 30. In this case, it can be seen that the third network device 30 is duplicately realized to the first and second bridges 40 and 42. In other words, unlike FIG. 2, FIG. 3 shows a state where the second bridge 42 realizes the proxy function of the third network device 30 together with the first bridge 40, and thus the third proxy UPnP devices 31 realizing the proxy function of the third non-TCP/IP layer based network device 30 are duplicated and activated.

In FIG. 3, in the case where two or more bridges realize the proxy function of one non-TCP/IP layer based network device, the following problems may be generated.

First, there is a problem in that the status of the duplicated third proxy UPnP devices 31 is not synchronized. Here, the status may be generally divided into two states. Of them, one is the status where the third network device itself has access to the network, and because the third proxy UPnP devices 31 implemented within the bridges 40 and 42 are either fetched from the third network device 30 or set to the third network device 30 whenever necessary, the status incurs no problem even if several third proxy UPnP devices 31 are implemented. The other is the status where the third proxy UPnP device 31 implemented within each bridge has access to the network, and even if the proxy UPnP device 31 realizes the proxy function of the same third network device 30 in the process of sending/receiving signals to/from the UPnP control point 50, the status is changed according the proxy UPnP device within each bridge, thus incurring a problem.

Second, there is another problem generated when any one of the duplicated third proxy UPnP devices 31 sends a termination message, which is hereafter referred to as a "bye-bye message", in order to terminate its function. In this case, the UPnP control point 50 identifies a Universally Unique Identifier (UUID) peculiar to any one of the third proxy UPnP devices 31 which is included in the bye-bye message, and then removes the identified proxy UPnP device. However, because the other of the duplicated third proxy UPnP devices 31 is still activated within the other bridge, the control point 50 does not recognize the other third proxy UPnP device.

SUMMARY OF THE INVENTION

In view of the above, the present invention provides a network connection device, network system and method for avoiding duplication of proxy functions realized within a plurality of bridges in the case where a network device which does not support a first communication mode (e.g., TCP/IP layer communication mode) must be connected over a network of the first communication mode and must realize a function (e.g., UPnP function) which is supported only in the first communication mode.

According to an exemplary embodiment of the present invention, there is provided a network connection device, comprising: a bridge module for relaying a communication module of a first communication mode and a communication module of a second communication mode; a proxy Universal Plug and Play (UPnP) service module, connected with the bridge module, for providing a proxy function of a network device of the second communication mode; and a duplicate proxy Universal Plug and Play service module, connected with the communication module of the first communication mode and the proxy Universal Plug and Play service module, for preventing the proxy function of the network device of the second communication mode from being duplicated and activated at a plurality of bridges.

Another exemplary embodiment of the present invention provides a network system for avoiding duplication of proxy functions, comprising: a plurality of network devices of a first communication mode; a plurality of network devices of a second communication mode; a normal bridge for activating proxy functions of the network devices of the second communication mode to connect the plurality of network devices of the first communication mode and the plurality of network devices of the second communication mode; and an enabled bridge including a function of the normal bridge and controlling to avoid duplication of the proxy functions of the network devices of the second communication mode which are simultaneously activated at a plurality of bridges.

Yet another exemplary embodiment of the present invention provides a method for avoiding duplication of proxy functions, comprising the steps of: (a) accessing a normal bridge to a network and activating a proxy Universal Plug and Play (UPnP) device in which the proxy function of a non-TCP/IP layer based network device is realized; (b) accessing an enabled bridge to the network; (c) checking at a duplicate proxy Universal Plug and Play service module of the accessed enabled bridge whether or not the proxy Universal Plug and Play device is activated at the normal bridge; and (d) preventing the proxy Universal Plug and Play device from being activated at a proxy Universal Plug and Play service module of the enabled bridge.

Additionally, according to an exemplary embodiment, the present invention provides a method for avoiding duplication of proxy functions, comprising the steps of: (a) accessing an enabled bridge to a network and activating a proxy Universal Plug and Play (UPnP) device in which the proxy function of a non-TCP/IP layer based network device is realized; (b) accessing a normal bridge to the network and activating the proxy Universal Plug and Play device; (c) checking whether or not the proxy Universal Plug and Play device activated at the normal bridge is identical to the proxy Universal Plug and Play device activated at a proxy Universal Plug and Play service module of the enabled bridge; and (d) if the activated proxy Universal Plug and Play devices are identical to each other, preventing the proxy Universal Plug and Play device activated at a proxy Universal Plug and Play service module of the enabled bridge from being activated at a duplicate proxy Universal Plug and Play service module of the enabled bridge and sending a bye-bye message.

According yet still another exemplary embodiment of the present invention, there is provided a method for avoiding duplication of proxy functions, comprising the steps of: (a) accessing a first enabled bridge to a network and activating a proxy Universal Plug and Play (UPnP) device in which the proxy function of a non-TCP/IP layer based network device is realized; (b) accessing a second enabled bridge to the network; (c) checking whether or not the proxy Universal Plug and Play device intended to be activated at the second enabled bridge is identical to the proxy Universal Plug and Play device activated at the first enabled bridge; and (d) if the proxy Universal Plug and Play devices are identical to each other, synchronizing status of duplicated proxy Universal Plug and Play devices at the first and second enabled bridges.

According to an exemplary embodiment, device cards are mounted to network devices respectively, thus providing device-specific UUIDs, so that information of the network devices and a method for controlling the network devices can be provided.

Further, the following description will be made under the assumption that a first communication mode is a TCP/IP layer and a second communication mode is a non-TCP/IP layer. Therefore, a device where the proxy function of the network device of the second communication mode is activated within the bridge is named a proxy UPnP device. However, the assumption that the first communication mode is the TCP/IP layer and the second communication mode is the non-TCP/IP layer is placed to help understanding of the exemplary embodiments, but the invention may be applied to different classification types.

BRIEF DESCRIPTION OF THE DRAWINGS

The above objects, features and advantages of the present invention will become more apparent from the following detailed description when taken in conjunction with the accompanying drawings, in which:

FIGS. 7, 8A and 8B illustrate a method for avoiding duplication of proxy UPnP functions according to another exemplary embodiment of the present invention.

DETAILED DESCRIPTION OF THE ILLUSTRATIVE, NON-LIMITING EMBODIMENTS

An exemplary embodiment of the invention will be described below in detail with reference to the accompanying drawings.

Figure 4:
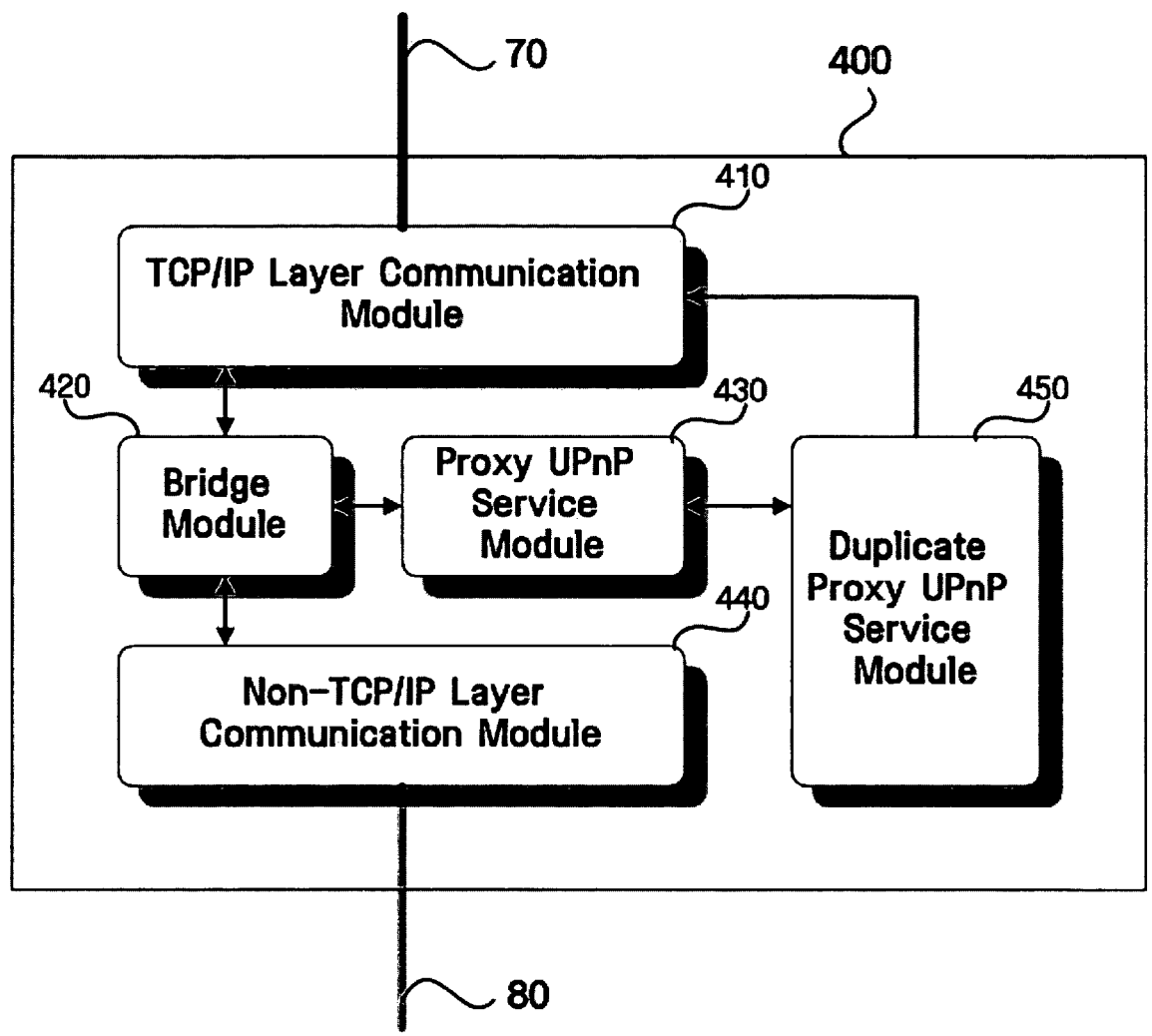
FIG. 4 shows an internal configuration of an enabled bridge for avoiding duplication of proxy functions in accordance with an exemplary embodiment of the present invention.

FIG. 4 shows an internal configuration of an enabled bridge for avoiding duplication of proxy functions in accordance with an exemplary embodiment of the invention. The enabled bridge 400 includes a TCP/IP layer communication module 410, a bridge module 420, a proxy UPnP service module 430, a non-TCP/IP layer communication module 440, and a duplicate proxy UPnP service module 450.

The TCP/IP layer communication module 410 supports communication with a TCP/IP layer based network device, while the non-TCP/IP layer communication module 440 supports communication with a non-TCP/IP layer based network device.

The bridge module 420 functions to enable communication by relaying the TCP/IP layer communication module 410 belonging to a first communication mode and the non-TCP/IP layer communication module 440 belonging to a second communication mode.

The proxy UPnP service module 430 is connected with the bridge module 420, and functions to activate the proxy function of the non-TCP/IP layer based network device.

The duplicate proxy UPnP service module 450 is connected with the TCP/IP layer communication module 410 and the proxy UPnP service module 430, and functions to prevent duplication of the proxy function of the non-TCP/IP layer based network device, wherein the proxy function is activated at a plurality of bridges at the same time. Meanwhile, the TCP/IP layer communication module 410 is connected to a TCP/IP based network line 70, and the non-TCP/IP layer communication module 440 is connected to a non-TCP/IP based network line 80.

Figure 5:
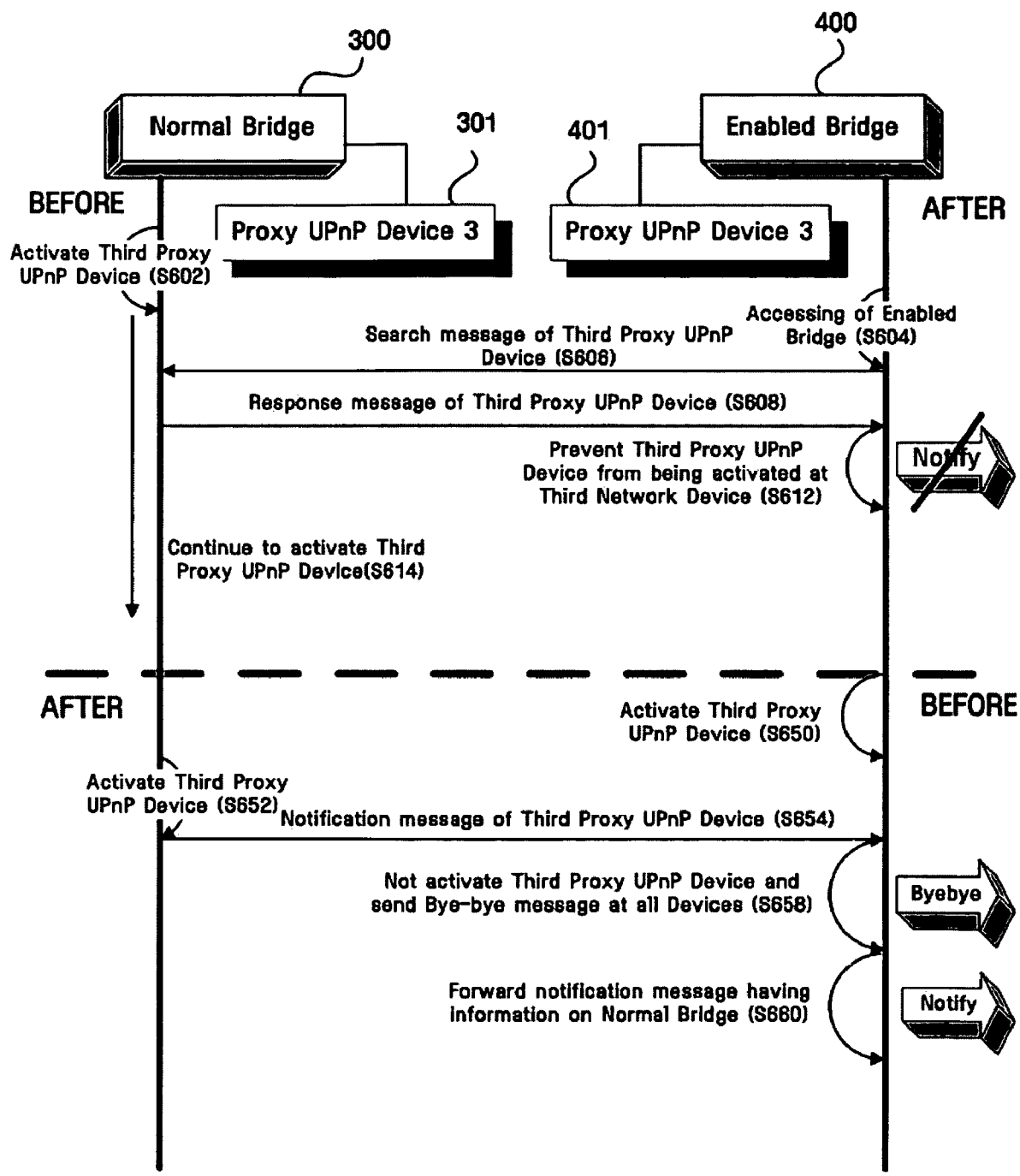
FIGS. 5, 6A and 6B illustrate a method for avoiding duplication of proxy UPnP functions according to an exemplary embodiment of the present invention.
Figure 6A:
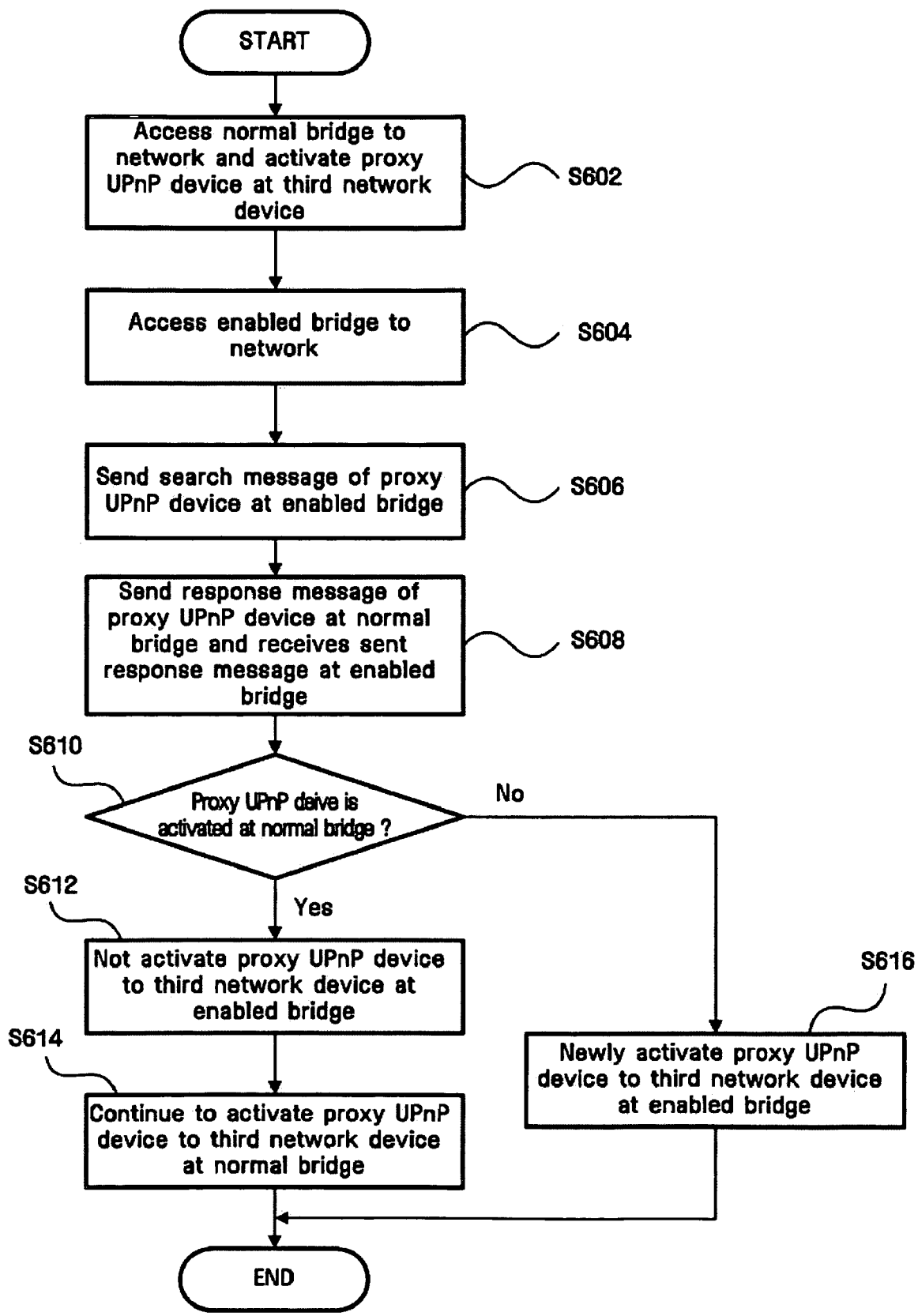
Figure 6B:
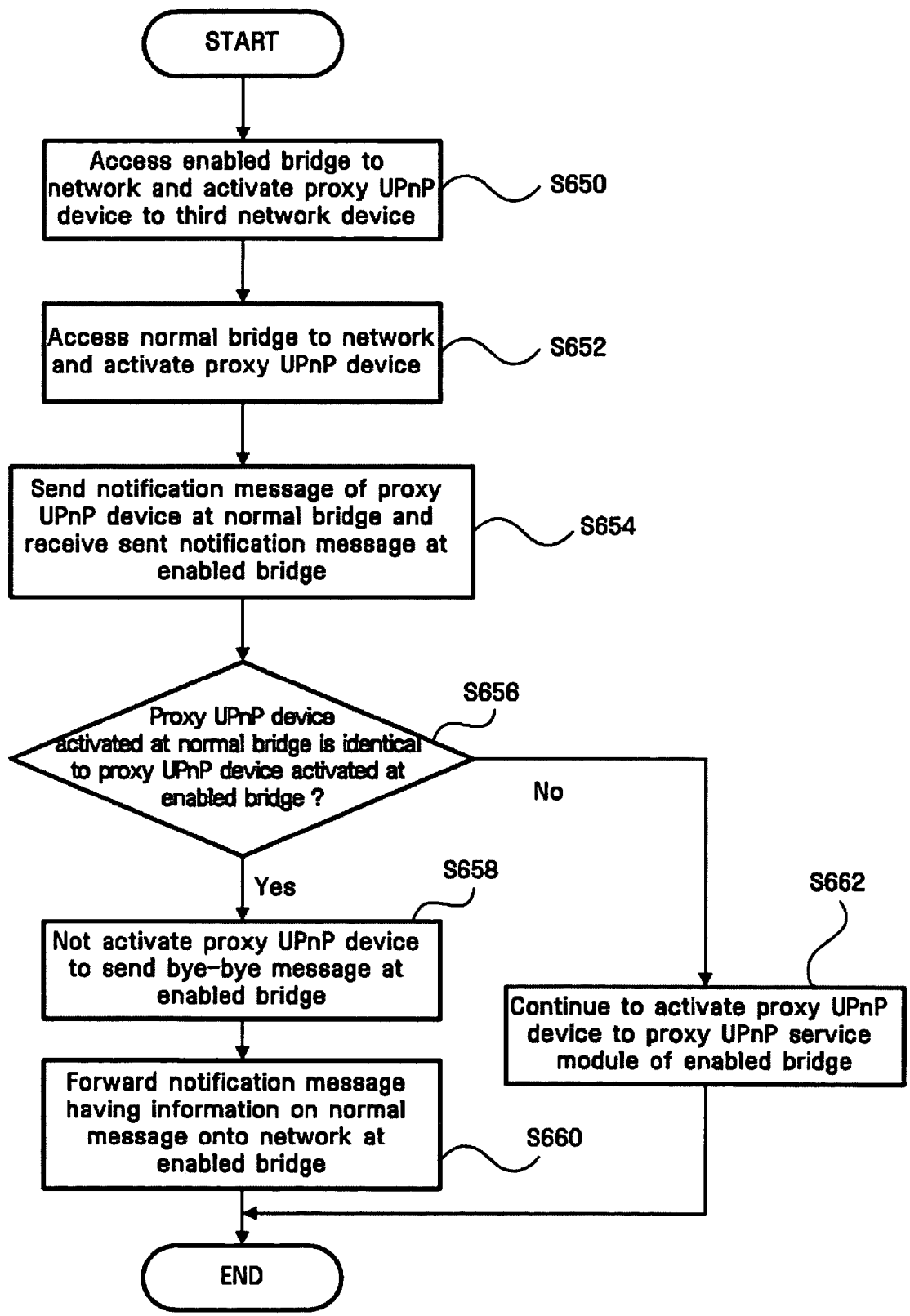

FIGS. 5, 6A and 6B illustrate a method for avoiding duplication of proxy UPnP functions according to an exemplary embodiment of the invention.

Figure 1A:
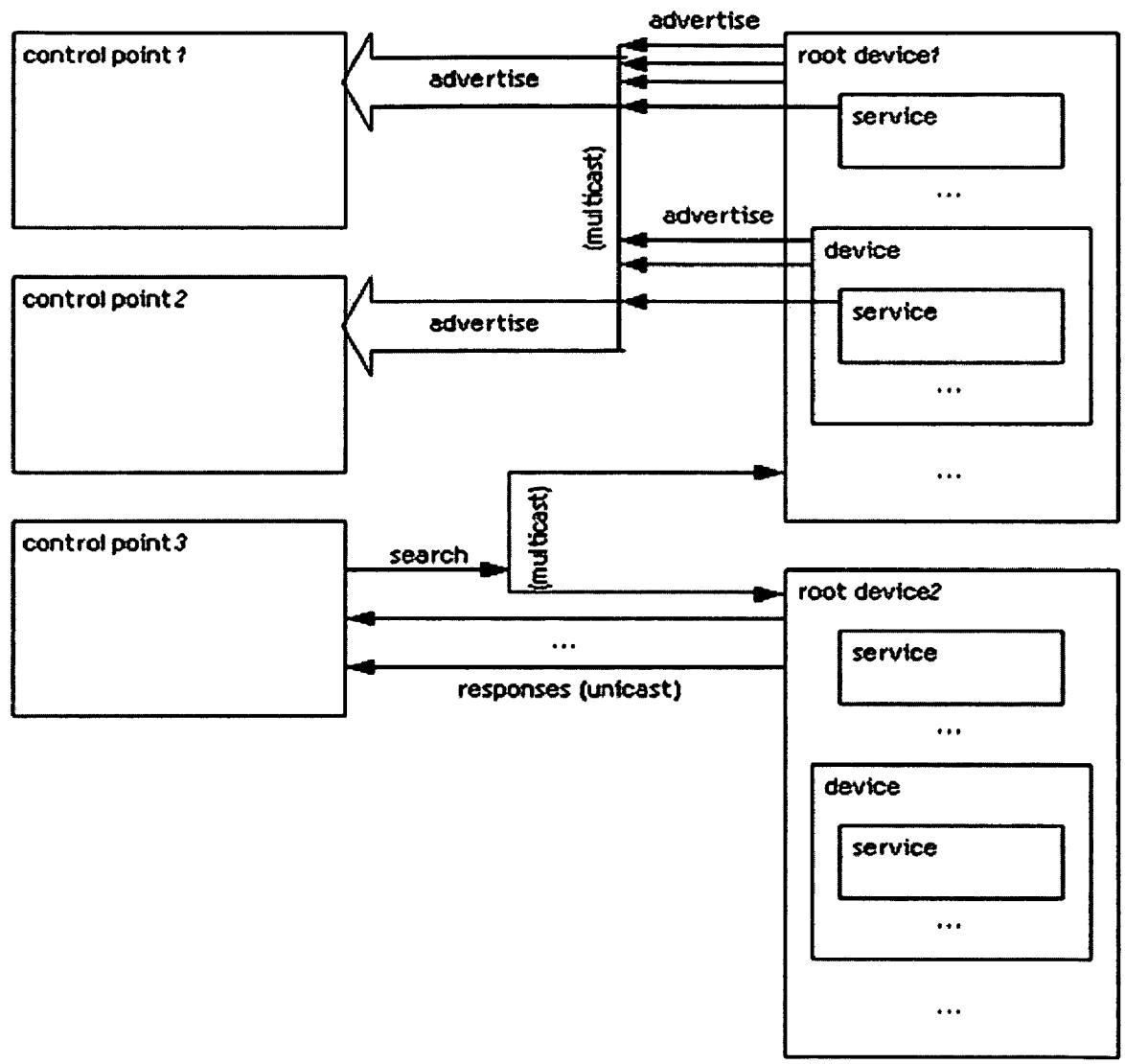
FIGS. 1A, 1B, 1C and 1D show an operation of each step in a control process between devices on a conventional home network.
Figure 1B:
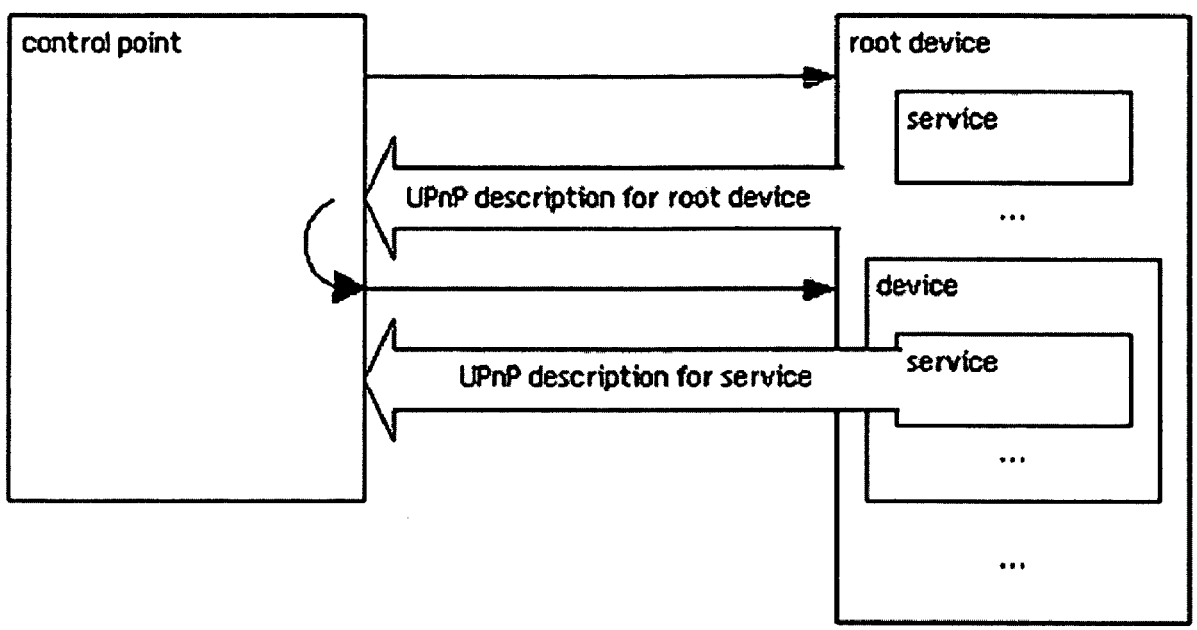
Figure 1C:
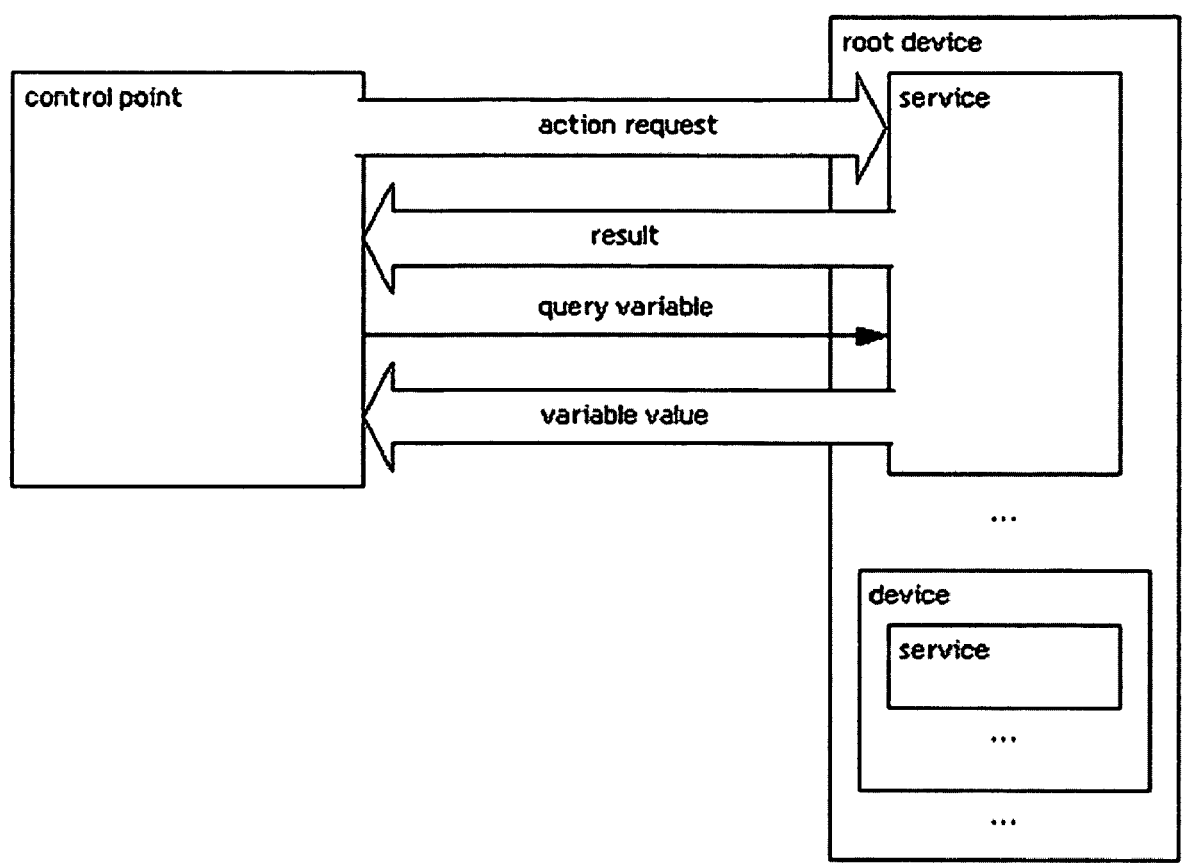
Figure 1D:
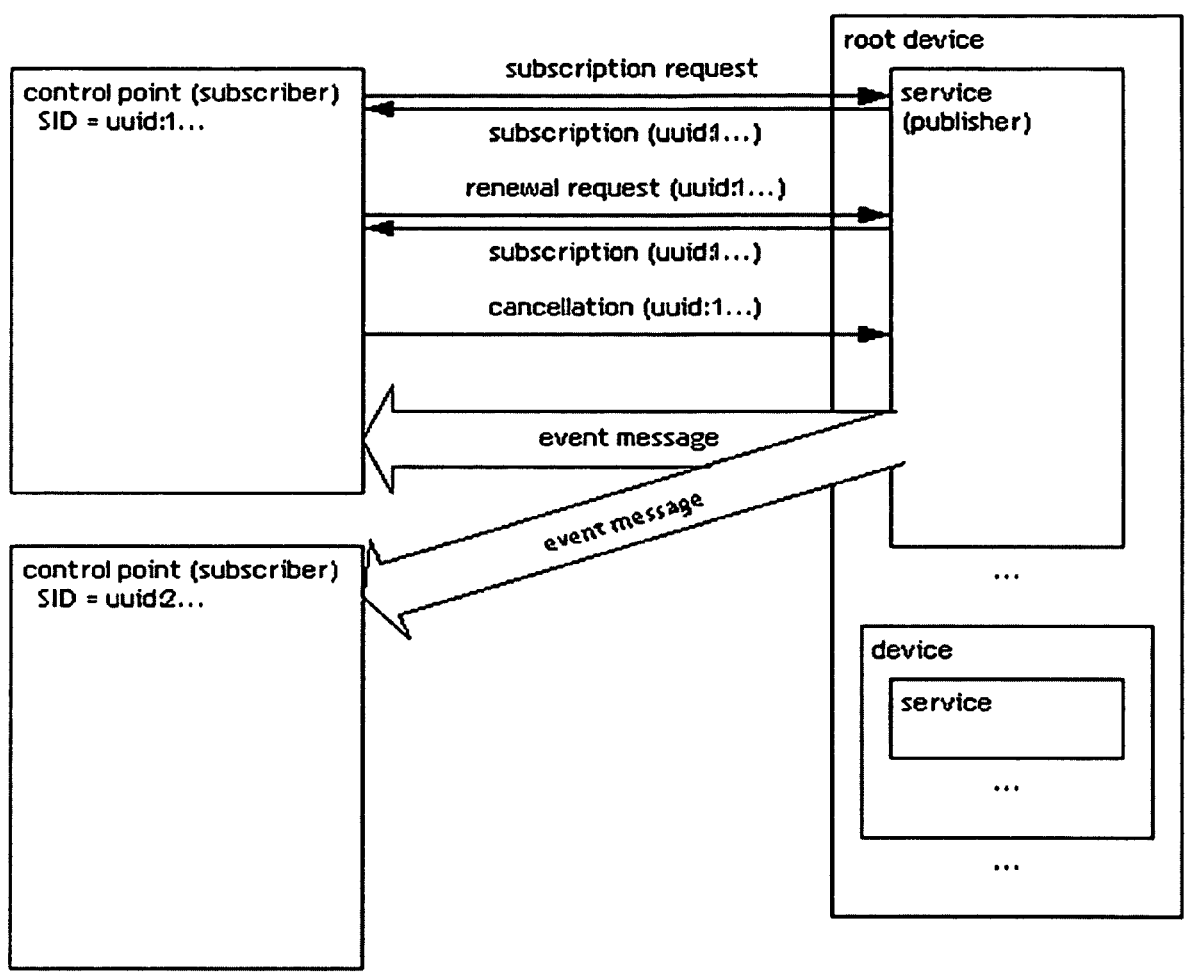
Figure 2:
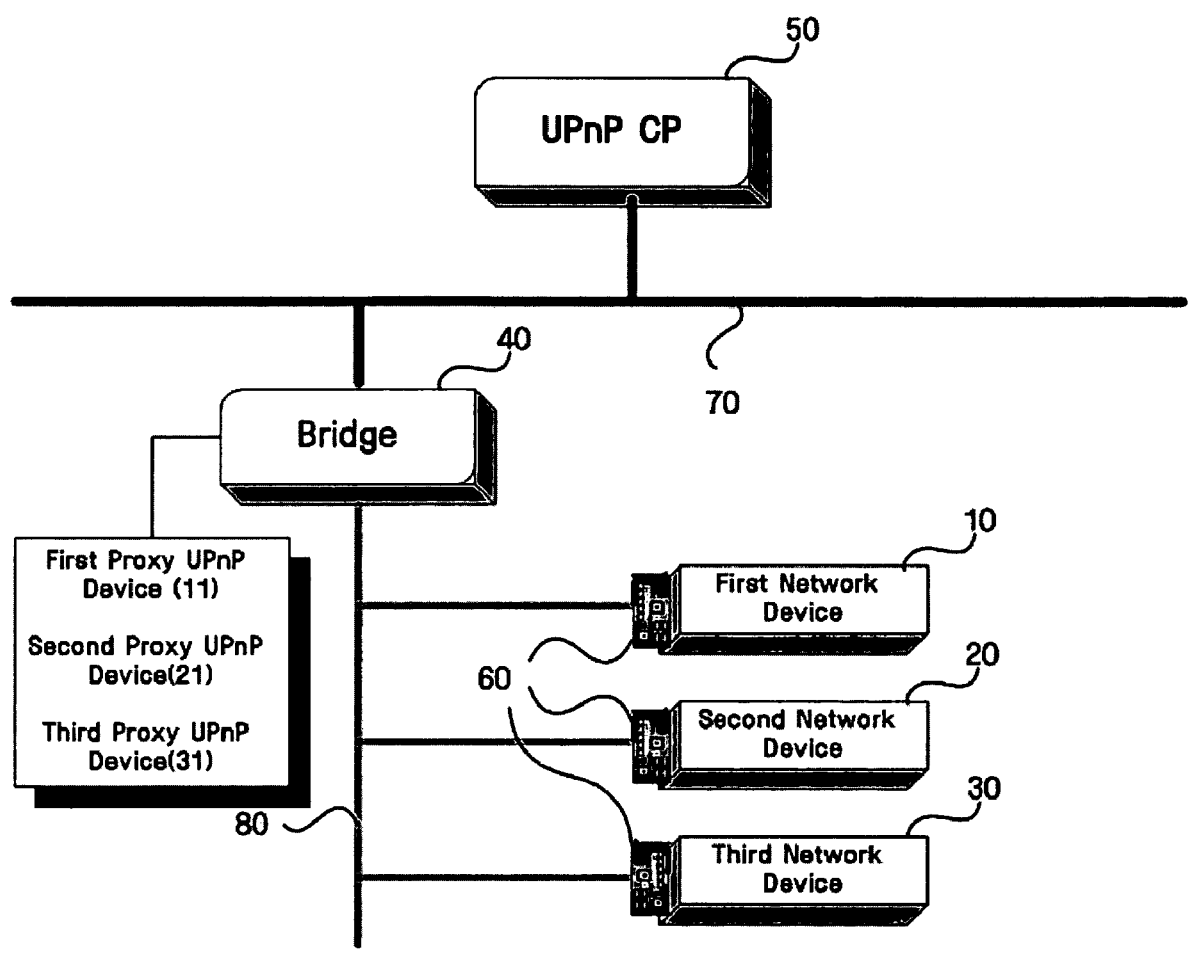
FIG. 2 shows a state where one bridge within a conventional home network realizes proxy UPnP devices to non-TCP/IP layer based network devices.
Figure 3:
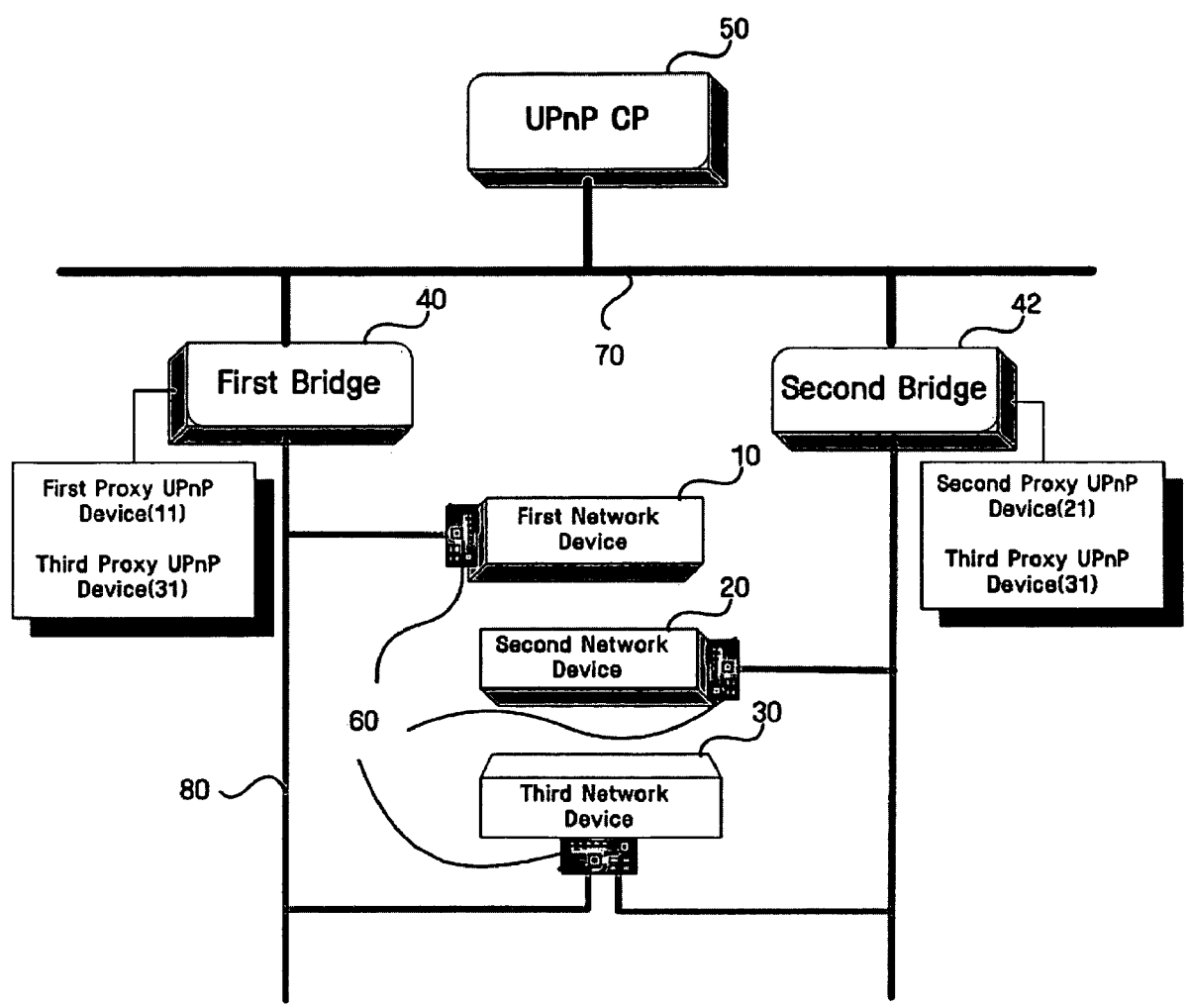
FIG. 3 shows a state where two bridges within a conventional home network duplicately realize proxy UPnP devices to non-TCP/IP layer based network devices.

The method of FIG. 5 is for solving the problems in the method of FIG. 3. For the sake of descriptive convenience, any device in which the proxy function of the third non-TCP/IP layer based network device is realized is called a third proxy UPnP device 301 or 401. In FIG. 5, it is shown that both third proxy UPnP devices 301 and 401 solve a problem on duplication and activation.

A normal bridge 300 and the enabled bridge 400 are also shown in FIG. 5. Two bridges all make it possible to activate the proxy UPnP devices in which the proxy function of the non-TCP/IP layer based network device is realized.

The normal bridge 300, as a conventional general bridge, functions to activate the proxy function of the network device of the second communication mode (non-TCP/IP layer) to connect the network device of the second communication mode with the network device of the first communication mode, and is named a normal bridge by contrast with the enabled bridge 400 for solving the conventional problems. The enabled bridge 400, as a network connection device for avoiding duplication of proxy functions according to the invention, includes a function of the normal bridge 300, and functions to control to avoid duplication of the proxy functions which are activated at the plurality of bridges at the same time.

Among other things, the case where the normal bridge 300 has access to the network first and then the enabled bridge 400 has access to the network will be described. This case is shown above the dotted line of FIG. 5, and in FIG. 6A.

The normal bridge 300 has access to the network to activate the third proxy UPnP device 301 in which the proxy function is realized to the non-TCP/IP layer based network device (S602), and then the enabled bridge 400 has access to the network (S604). The enabled bridge 400 sends a search message of the proxy UPnP device 301 which is intended to activate the proxy function (S606), and the normal bridge 300 sends a response message in response to the search message (S608). In other words, on the basis of the response message of the normal bridge 300 responding to the search message sent by the enabled bridge 400, it is checked whether or not the proxy UPnP device is activated at the normal bridge 300 (S610). This checking is performed by the duplicate proxy UPnP service module 450 of the enabled bridge 400. The fact that the enabled bridge 400 has received the response message refers to that the proxy UPnP device 301 intended to realize the proxy function has been already activated at the normal bridge 300. Thus, the proxy UPnP service module 430 of the enabled bridge 400 does not activate the proxy UPnP device 401 (S612). Further, the normal bridge 300 continues to activate the proxy UPnP device 301 which realizes the proxy function of the third non-TCP/IP layer based network device (S614).

Meanwhile, in the case where the proxy UPnP device 301 is not activated at the normal bridge 300, the proxy UPnP service module 430 of the enabled bridge 400 newly activates the proxy UPnP device 401 which realizes the proxy function of the third network device (S616).

Next, the case where the enabled bridge 400 has access to the network first and then the normal bridge 300 has access to the network will be described. This case is shown under the dotted line of FIG. 5 and in FIG. 6B.

First, the enabled bridge 400 has access to the network to activate the third proxy UPnP device 401 in which the proxy function of the non-TCP/IP layer based network device is realized (S650), and then the normal bridge 300 has access to the network to activate the third proxy UPnP device 301 (S652).

Because the normal bridge 300 has activated the third proxy UPnP device 301, the normal bridge 300 sends a notification message according to this activation, and the enabled bridge 400 receives the notification message (S654). In other words, on the basis of the notification message of the non-TCP/IP layer based network device which the normal bridge 300 sends and which the enabled bridge 400 receives, it is checked whether or not the proxy UPnP device 301 activated at the normal bridge 300 is identical to the proxy UPnP device 401 activated at the proxy UPnP service module 430 of the enabled bridge 400 (S656).

If it is checked and the activated proxy UPnP devices are identical to each other, the duplicate proxy UPnP service module 450 of the enabled bridge 400 sends a bye-bye message while not activating the proxy UPnP device 401 activated at the proxy UPnP service module 430 (S658). In other words, the duplicate proxy UPnP service module 450 is to notify that the proxy UPnP device 401 which the duplicate proxy, UPnP service module has realized is no longer present within the network. Then, the TCP/IP layer communication module 410 of the enabled bridge 400 forwards the notification message having information on the normal bridge 300 onto the network (S660). This is because, while the enabled bridge 400 activates the proxy function, even though the normal bridge 300 activating the proxy UPnP device 301 sends the notification message onto the network, the existing UPnP control points do not recognize the notification message. Therefore, by forwarding the notification message sent by the normal bridge 300 after sending the bye-bye message, the enabled bridge 400 itself is removed from the network, but informs the control points on the TCP/IP network that the proxy UPnP device 301 is still activated at the normal bridge 300.

Meanwhile, if it is checked and the activated proxy UPnP devices 301 and 401 are not identical to each other, the proxy UPnP device 401 continues to be activated at the proxy UPnP service module 430 of the enabled bridge 400 (S662).

Figure 8A:
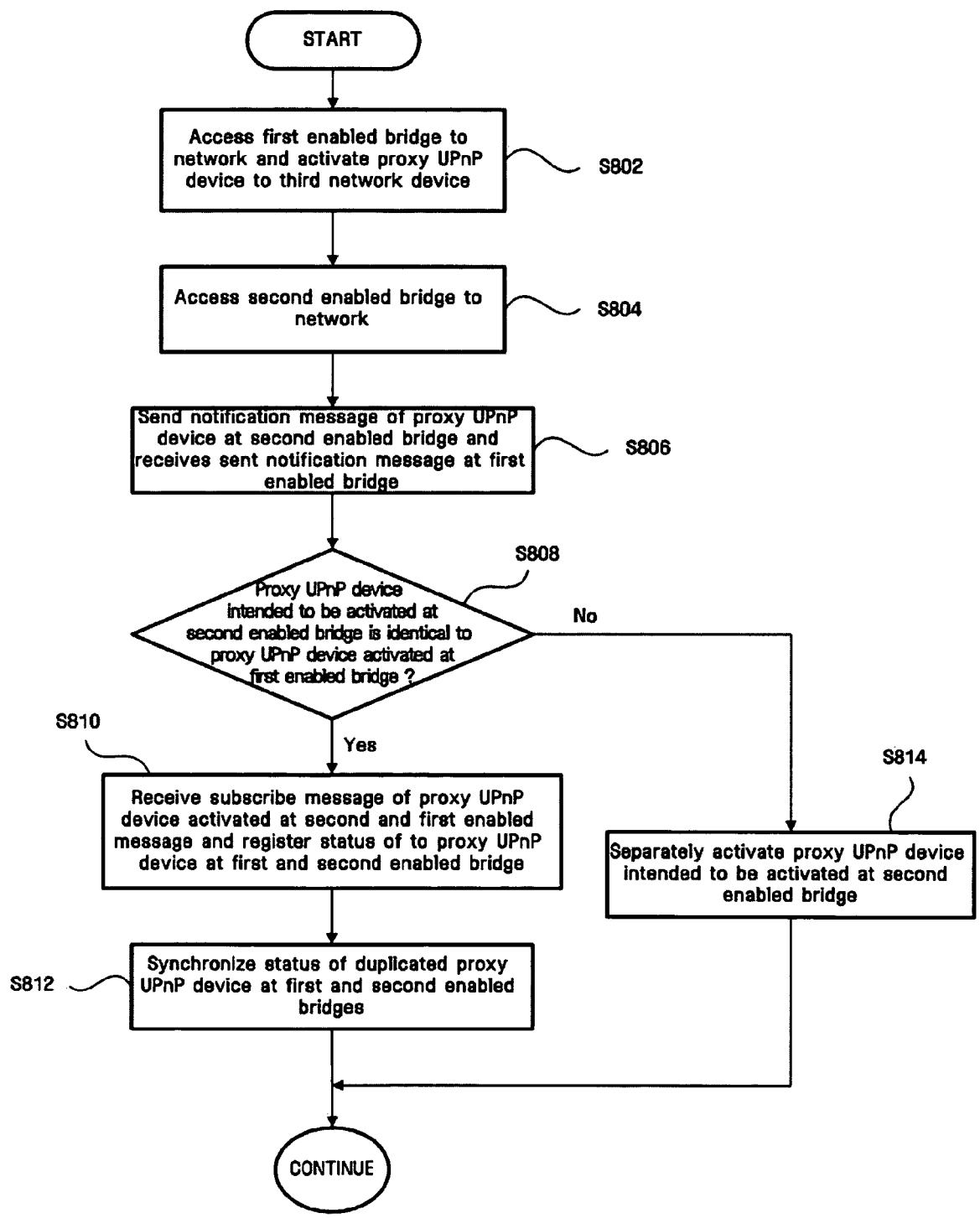
Figure 8B:
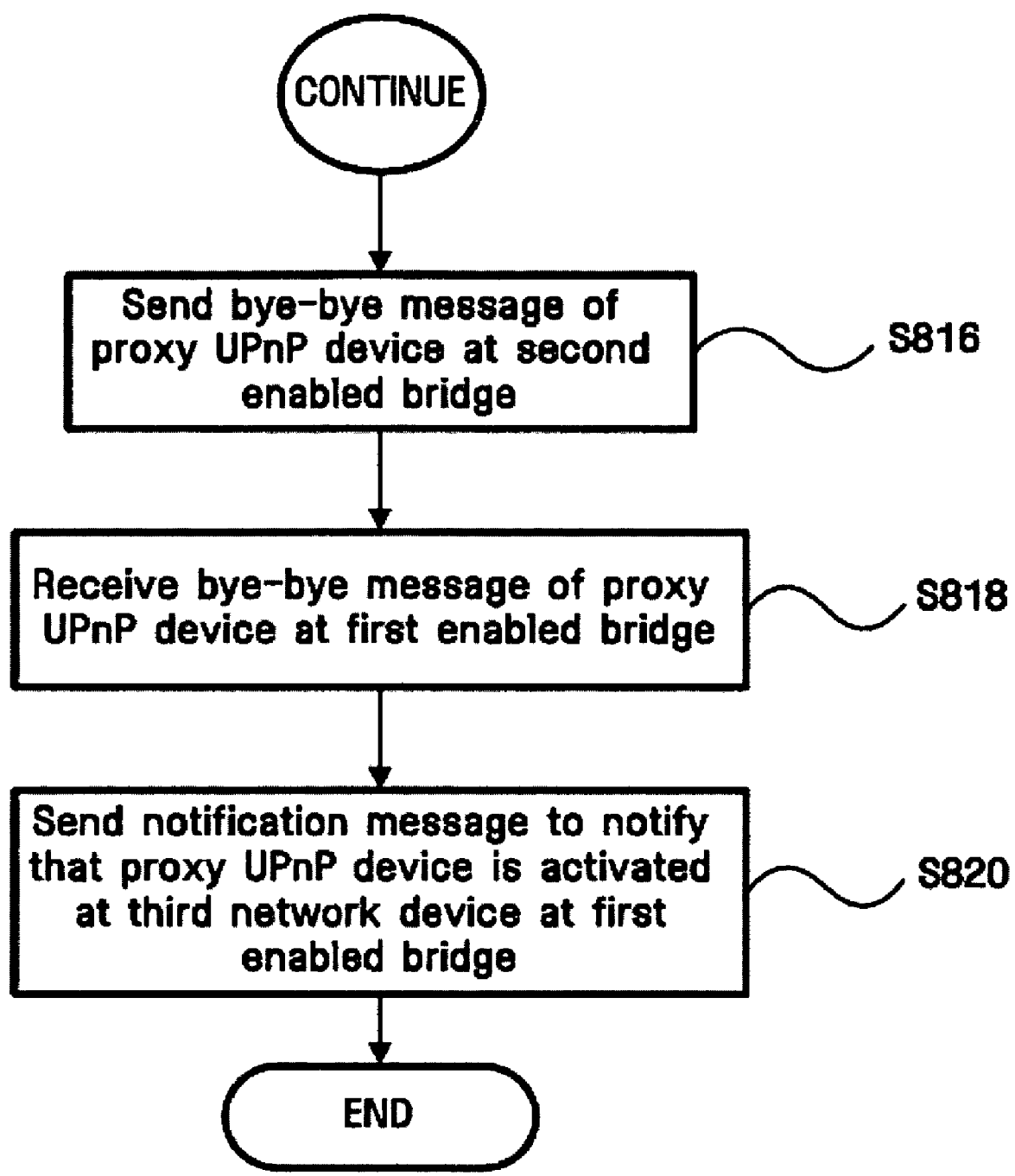

FIGS. 7, 8A and 8B illustrate a method for avoiding duplication of proxy UPnP functions according to another embodiment of the invention. FIG. 7 shows first and second enabled bridges 710 and 720, both of which can activate proxy UPnP devices 713 and 723 in which the proxy function of the non-TCP/IP layer based network device is realized. The embodiments of FIGS. 5, 6A and 6B have been described regarding the case where the normal and enabled bridges are provided, but that of FIGS. 7, 8A and 8B will be described regarding the case where at least two enabled bridges are provided. In FIG. 7, for the sake of descriptive convenience, description will be made under the assumption that two enabled bridges 710 and 720 are provided. Therefore, it will be easily understood to those skilled in the art from the embodiment that three or more enabled bridges may be provided.

Above all, in the case where the first enabled bridge 710 has access to the network first and then the second enabled bridge 720 has access to the network, description on synchronization of two proxy functions will be made. This case is shown above the dotted line of FIG. 7 and in FIG. 8A.

The first enabled bridge 710 has access to the network to activate the third proxy UPnP device 713 in which the proxy function of the non-TCP/IP layer based network device is realized (S802), and then the second enabled bridge 720 has access to the network to intend to activate the third proxy UPnP device 723 (S804).

The TCP/IP layer communication module 410 sends the notification message of the third proxy UPnP device 723 which the second enabled bridge 720 intends to activate, and the first enabled bridge 710 receives the notification message (S806).

In other words, according to the notification message which the second enabled bridge 720 sends and which the first enabled bridge 710 receives, it is checked whether or not the third proxy UPnP device 723 intended to be activated at the second enabled bridge 720 is identical to the third proxy UPnP device 713 activated at the first enabled bridge 710 (S808).

If it is checked and the third proxy UPnP devices 713 and 723 are identical to each other, each duplicate proxy UPnP service module 450 of the first and second enabled bridges 710 and 720 receives each subscribe message of the third proxy UPnP devices which are activated at the first and second enabled bridges 710 and 720 respectively, and registers current status of the third proxy UPnP devices (S810). In other words, whenever an event takes place at any one of the proxy UPnP devices, the subscribe message of the interested proxy UPnP device is sent to cause the event to be registered. Thereby, the first and second enabled bridges 710 and 720 are to synchronize the status of the third proxy UPnP devices 713 and 723 which are simultaneously implemented (S812).

However, if it is checked and the third proxy UPnP devices 713 and 723 are not identical to each other, the third proxy UPnP device intended to be activated at the second enabled bridge 720 is activated independently of the first enabled bridge 710 (S814).

Meanwhile, in the state where two or more proxy UPnP devices are simultaneously activated, the case where any one of the proxy UPnP devices sends the bye-bye message to terminate the proxy function incurs a problem, the solution of which is shown under the dotted line of FIG. 7 and in FIG. 8A.

The TCP/IP layer communication module 410 of the second enabled bridge 720 sends the bye-bye message of the third proxy UPnP device 723, and the first enabled bridge 710 receives the sent bye-bye message (S816 and S818). The TCP/IP layer communication module 410 of the first enabled bridge 710 which receives the bye-bye message sends a notification message of the third proxy UPnP device 713, thereby informing the control points within the network that the third proxy UPnP device 713 is still activated at the TCP/IP layer communication module 410 itself (S820). Thus, the control points within the network have knowledge that the first enabled bridge 710 continues to realize the proxy function even though the second enabled bridge 720 terminates the proxy function which has been activated.

While the invention has been shown and described with reference to certain exemplary embodiments thereof, it will be understood by those skilled in the art that various changes in form and details may be made therein without departing from the spirit and scope of the invention as defined by the appended claims.

According to the exemplary embodiment as set forth above, first, by preventing a collision with the proxy UPnP function realized to the existing normal bridge, the duplicated proxy UPnP device is prevented from being activated.

Second, by synchronizing the duplicated proxy functions to the plurality of enabled bridges, the collision probability caused by the duplicated proxy functions is prevented. As a result, the environment capable of using the home network a bit more effectively than the presence of one proxy UPnP device is provided to allow the traffics within the network to be distributed.

What is claimed is:

1. A network connection device comprising:
   a bridge module relaying a communication module of a first communication mode connected to a first network line and a communication module of a second communication mode connected to a second network line;
   a proxy Universal Plug and Play (UPnP) service module connected with the bridge module, and providing a proxy function of a network device of the second communication mode; and
   a duplicate proxy Universal Plug and Play service module connected with the communication module of the first communication mode and the proxy Universal Plug and Play service module,
   wherein the duplicate proxy Universal Plug and Play service module, in the case where a normal bridge has access to a network first and then the network connection device has access to the network, according to a response message of the normal bridge responding to a search message which the network connection device sends, checks whether a proxy Universal Plug and Play device in which the proxy function of a non-TCP/IP layer based network device is realized is activated at the normal bridge and prevents the proxy function of the network device of the second communication mode from being duplicated and activated at a plurality of bridges, and
   wherein the duplicate proxy Universal Plug and Play service module, in the case where the network connection device has access to a network first and then a normal bridge has access to the network, checks whether a proxy Universal Plug and Play device which is activated at the normal bridge is identical to a proxy Universal Plug and Play device which has been already activated at the proxy Universal Plug and Play service module and prevents the proxy function of the network device of the second communication mode from being duplicated and activated at a plurality of bridges.

2. The network connection device as claimed in claim 1, wherein the first communication mode is a TCP/IP layer and the second communication mode is a non-TCP/IP layer.

3. The network connection device as claimed in claim 2, further comprising a TCP/IP layer communication module supporting communication with a TCP/IP layer based network device and sending a notification message containing information on the proxy Universal Plug and Play device.

4. The network connection device as claimed in claim 2, wherein the duplicate proxy Universal Plug and Play service module checks whether a proxy Universal Plug and Play device of a non-TCP/IP layer based network device activated at a second network connection device is identical to a proxy Universal Plug and Play device activated at a first network connection device.

5. The network connection device as claimed in claim 4, wherein the duplicate proxy Universal Plug and Play service module synchronizes status of the proxy Universal Plug and Play devices which are simultaneously activated at the plurality of network connection devices.

6. The network connection device as claimed in claim 5, wherein the duplicate proxy Universal Plug and Play service module on the first and second network connection devices synchronizes the status of the proxy Universal Plug and Play devices which are simultaneously activated at the plurality of network connection devices by receiving each subscribe message of the proxy Universal Plug and Play devices activated at the second and first network connection devices to register current status of the proxy Universal Plug and Play devices.

7. A network system for avoiding duplication of proxy functions, comprising:
   a bridge module relaying a communication module of a first communication mode connected to a first network line and a communication module of a second communication mode connected to a second network line;
   a proxy Universal Plug and Play (UPnP) service module connected with the bridge module, and providing a proxy function of a network device of the second communication mode; and
   a duplicate proxy Universal Plug and Play service module connected with the communication module of the first communication mode and the proxy Universal Plug and Play service module,
   wherein the duplicate proxy Universal Plug and Play service module, in the case where a normal bridge has access to a network first and then an enabled bridge has access to the network, according to a response message of the normal bridge responding to a search message which the enabled bridge sends, checks whether a proxy Universal Plug and Play device in which the proxy function of a non-TCP/IP layer based network device is realized is activated at the normal bridge and prevents the proxy function of the network device of the second communication mode from being duplicated and activated at a plurality of bridges, and
   wherein the duplicate proxy Universal Plug and Play service module, in the case where an enabled bridge has access to a network first and then a normal bridge has access to the network, checks whether a proxy Universal Plug and Play device which is activated at the normal bridge is identical to a proxy Universal Plug and Play device which has been already activated at the proxy Universal Plug and Play service module and prevents the proxy function of the network device of the second communication mode from being duplicated and activated at a plurality of bridges.

8. The network system as claimed in claim 7, wherein the first communication mode is a TCP/IP layer and the second communication mode is a non-TCP/IP layer.

9. The network system as claimed in claim 8, further comprising a TCP/IP layer communication module supporting communication with a TCP/IP layer based network device and sending a notification message containing information on the proxy Universal Plug and Play device.

10. The network system as claimed in claim 8, wherein the duplicate proxy Universal Plug and Play service module checks whether a proxy Universal Plug and Play device of a non-TCP/IP layer based network device activated at a second enabled bridge is identical to a proxy Universal Plug and Play device activated at a first enabled bridge.

11. The network system as claimed in claim 10, wherein the duplicate proxy Universal Plug and Play service module synchronizes status of the proxy Universal Plug and Play devices which are simultaneously activated at the plurality of enabled bridges.

12. The network system as claimed in claim 11, wherein the duplicate proxy Universal Plug and Play service module on the first and second enabled bridges synchronizes the status of the proxy Universal Plug and Play devices which are simultaneously activated at the plurality of enabled bridges by receiving each subscribe message of the proxy Universal Plug and Play devices activated at the second and first enabled bridges to register current status of the proxy Universal Plug and Play devices.

13. A method for avoiding duplication of proxy functions, the method comprising:
(a) accessing an enabled bridge to a network and activating a proxy Universal Plug and Play (UPnP) device in which the proxy function of a non-TCP/IP layer based network device is realized;
(b) accessing a normal bridge to the network and activating the proxy Universal Plug and Play device;
(c) checking whether the proxy Universal Plug and Play device activated at the normal bridge is identical to the proxy Universal Plug and Play device activated at a proxy Universal Plug and Play service module of the enabled bridge; and
(d) if the activated proxy Universal Plug and Play devices are identical to each other, preventing the proxy Universal Plug and Play device activated at a proxy Universal Plug and Play service module of the enabled bridge from being activated at a duplicate proxy Universal Plug and Play service module of the enabled bridge and sending a termination message.

14. The method as claimed in claim 13, wherein the step (d) continues to cause the proxy Universal Plug and Play device to be activated at the proxy Universal Plug and Play service module of the enabled bridge if the activated proxy Universal Plug and Play devices are not identical to each other.

15. The method as claimed in claim 14, wherein the step (c) performs checking according to information of a notification message of the non-TCP/IP layer based network device which the normal bridge sends and which the enabled bridge receives.

16. The method as claimed in claim 13, further comprising the step of (e) forwarding a notification message having information on the normal bridge onto the network at a TCP/IP layer communication module of the enabled bridge.

17. The method as claimed in claim 16, wherein the step (c) performs checking according to information of a notification message of the non-TCP/IP layer based network device which the normal bridge sends and which the enabled bridge receives.

18. The method as claimed in claim 13, wherein the step (c) performs checking according to information of a notification message of the non-TCP/IP layer based network device which the normal bridge sends and which the enabled bridge receives.

19. A method for avoiding duplication of proxy functions, the method comprising:
(a) accessing a first enabled bridge to a network and activating a proxy Universal Plug and Play (UPnP) device in which the proxy function of a non-TCP/IP layer based network device is realized;
(b) accessing a second enabled bridge to the network;
(c) checking whether the proxy Universal Plug and Play device intended to be activated at the second enabled bridge is identical to the proxy Universal Plug and Play device activated at the first enabled bridge; and
(d) if the proxy Universal Plug and Play devices are identical to each other, synchronizing status of duplicated proxy Universal Plug and Play devices at the first and second enabled bridges.

20. The method as claimed in claim 19, wherein the step (d) synchronizes the status of the proxy Universal Plug and Play devices which are simultaneously activated at the plurality of enabled bridges by allowing each duplicate proxy Universal Plug and Play service module of the first and second enabled bridges to receive each subscribe message of the proxy Universal Plug and Play devices activated at the second and first enabled bridges to register current status of the proxy Universal Plug and Play devices.

21. The method as claimed in claim 20, further comprising:
(e1) sending a termination message of the proxy Universal Plug and Play device at a TCP/IP layer communication module of the second enabled bridge; and
(e2) sending a notification message of the proxy Universal Plug and Play device at a TCP/IP layer communication module of the first enabled bridge receiving the termination message.

22. The method as claimed in claim 19, wherein the step (c) performs checking according to information of a notification message which the second enabled bridge sends and which the first enabled bridge receives.

23. The method as claimed in claim 22, further comprising:
(e1) sending a termination message of the proxy Universal Plug and Play device at a TCP/IP layer communication module of the second enabled bridge; and
(e2) sending a notification message of the proxy Universal Plug and Play device at a TCP/IP layer communication module of the first enabled bridge receiving the termination message.

24. The method as claimed in claim 19, further comprising:
(e1) sending a termination message of the proxy Universal Plug and Play device at a TCP/IP layer communication module of the second enabled bridge; and
(e2) sending a notification message of the proxy Universal Plug and Play device at a TCP/IP layer communication module of the first enabled bridge receiving the termination message.

* * * * *

UNITED STATES PATENT AND TRADEMARK OFFICE
CERTIFICATE OF CORRECTION

| | | |
|---|---|---|
| PATENT NO. | : 7,617,316 B2 | Page 1 of 1 |
| APPLICATION NO. | : 10/980436 | |
| DATED | : November 10, 2009 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1375 days.

Signed and Sealed this

Nineteenth Day of October, 2010

David J. Kappos
*Director of the United States Patent and Trademark Office*